United States Patent
Matsushita et al.

(10) Patent No.: US 11,446,757 B2
(45) Date of Patent: Sep. 20, 2022

(54) DOUBLE-SIDED FRICTION STIR WELDING METHOD FOR METAL SHEETS AND DOUBLE-SIDED FRICTION STIR WELDING DEVICE

(71) Applicant: JFE STEEL CORPORATION, Tokyo (JP)

(72) Inventors: Muneo Matsushita, Tokyo (JP); Rinsei Ikeda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 381 days.

(21) Appl. No.: 16/637,906

(22) PCT Filed: Sep. 12, 2018

(86) PCT No.: PCT/JP2018/033761
§ 371 (c)(1),
(2) Date: Feb. 10, 2020

(87) PCT Pub. No.: WO2019/054400
PCT Pub. Date: Mar. 21, 2019

(65) Prior Publication Data
US 2020/0215644 A1    Jul. 9, 2020

(30) Foreign Application Priority Data
Sep. 13, 2017   (JP) .............................. JP2017-175618

(51) Int. Cl.
*B23K 20/00* (2006.01)
*B23K 20/12* (2006.01)

(52) U.S. Cl.
CPC ................ *B23K 20/1245* (2013.01)

(58) Field of Classification Search
CPC ............. B23K 20/122; B23K 20/1255; B23K 20/126; B23K 20/1265; B23K 2101/18; B23K 37/0235; B23K 37/0408
See application file for complete search history.

(56) References Cited

U.S. PATENT DOCUMENTS 6,715,664 B2    4/2004   Yamashita
10,259,085 B2 *  4/2019   Sato .......................... B23P 6/04
(Continued)

FOREIGN PATENT DOCUMENTS

CN    1421294 A    6/2003
CN    1969635 A    5/2007
(Continued)

OTHER PUBLICATIONS

Mar. 3, 2021 Office Action issued in Chinese Patent Application No. 201880052674.2.
(Continued)

*Primary Examiner* — Erin B Saad
(74) *Attorney, Agent, or Firm* — Oliff PLC

(57) ABSTRACT

There is provided a friction stir welding method in which, when double-sided friction stir welding is performed, enough plastic flow to obtain a welded state uniform in the thickness direction of metal sheets can be obtained, in which an increase in welding speed is achieved while the occurrence of defects during welding is prevented, and in which sufficient strength and improvement in welding workability can be achieved. There is also provided a friction stir welding device suitable for the friction stir welding.

2 Claims, 5 Drawing Sheets

(56) References Cited

U.S. PATENT DOCUMENTS

| | | | |
|---|---|---|---|
| 10,512,985 B2* | 12/2019 | Sato | B21D 22/14 |
| 2002/0179673 A1* | 12/2002 | Strombeck | B23K 20/1205 |
| | | | 228/1.1 |
| 2011/0084116 A1* | 4/2011 | Ohashi | B23K 20/125 |
| | | | 228/2.3 |

FOREIGN PATENT DOCUMENTS

| | | |
|---|---|---|
| CN | 102131612 A | 7/2011 |
| CN | 102481659 A | 5/2012 |
| EP | 2 474 382 A1 | 7/2012 |
| EP | 2 502 698 B1 | 8/2020 |
| JP | S62-183979 A | 8/1987 |
| JP | H07-505090 A | 6/1995 |
| JP | 3261433 B2 | 3/2002 |
| JP | 4479401 B2 | 6/2010 |
| JP | 4838385 B2 | 12/2011 |
| JP | 4838388 B2 | 12/2011 |
| JP | 5835952 B2 | 12/2015 |

OTHER PUBLICATIONS

Dec. 15, 2020 Office Action issued in Korean Patent Application No. 10-2020-7003456.
Nov. 27, 2018 International Search Report issued in International Patent Application No. PCT/JP2018/033761.
Jan. 28, 2020 Office Action issued in Japanese Patent Application No. 2018-563736.
Aug. 6, 2019 Office Action issued in Japanese Patent Application No. 2018-563736.
Jun. 19, 2020 Extended Search Report issued in European Patent Application No. 18857155.8.

\* cited by examiner

DOUBLE-SIDED FRICTION STIR WELDING METHOD FOR METAL SHEETS AND DOUBLE-SIDED FRICTION STIR WELDING DEVICE

TECHNICAL FIELD

This application relates to a double-sided friction stir welding method including: disposing a pair of opposed rotating tools on the top and bottom sides of a butt joint or a lap joint between metal sheets, so as to face each other; moving the pair of rotating tools along the butt joint or the lap joint in a welding direction while the pair of opposed rotating tools are rotated to thereby soften a portion of the metal sheets by heat of friction between the rotating tools and the metal sheets; stirring the softened portion with the rotating tools to generate plastic flow to thereby join the metal sheets together. The application also relates to a double-sided friction stir welding device for double-sided friction stir welding.

The application aims to solve a problem that may occur when the friction stir welding method is applied to welding of metal sheets or when the friction stir welding device is used, i.e., to eliminate poor plastic flow that occurs locally at the joint because of the differences in temperature and plastic flow in the direction of the thickness of the metal sheets at the joint to thereby eliminate welding defects advantageously, in order to obtain sufficient strength, improve welding workability, and particularly to improve the welding speed.

In the following description, a butt joint (or a lap joint) in which metal sheets (e.g., steel sheets) are butted (or lapped) together but still unwelded is referred to as an "unwelded joint," and an integrated portion joined by plastic flow is referred to as a "welded joint."

BACKGROUND

Patent Literature 1 discloses a friction welding method including: rotating one or both of a pair of metal materials to generate frictional heat in the metal materials to thereby soften the metal materials; and stirring the softened portion to cause plastic flow to thereby join the metal materials together. However, in this technique, since the materials to be joined are rotated, the shape and size of the metal materials are limited.

Patent Literature 2 proposes a method for joining metal sheets continuously in their longitudinal direction. In this method, a rotating tool formed of a material substantially harder than the metal sheets is inserted into an unwelded joint between the metal sheets. The rotating tool is moved while rotated to generate heat and plastic flow between the rotating tool and the metal sheets to thereby join the metal sheets together continuously in their longitudinal direction. In this technique, with the metal sheets fixed, the rotating tool is moved while rotated to thereby join the metal sheets together. One advantage is that substantially infinitely long members extending in their welding direction can be welded by solid-state joining continuously in their longitudinal direction. This technique further has the following various advantages. Since the metal sheets are welded by solid-state joining using the plastic flow of the metal caused by frictional heat generated by the rotating tool and the metal sheets, the metal sheets can be joined without melting the joint. Since the heating temperature is low, deformation after welding is small. Since the joint is not melted, less defects are generated. Moreover, no filler metal is necessary.

The friction stir welding method has been increasingly used as a method for welding low-melting point metal sheets typified by aluminum alloy sheets and magnesium alloy sheets in the fields of aircraft, ships, railroad cars, automobiles, etc. The reason for this is as follows. With a conventional arc welding method, it is difficult for the welded joint between these low-melting point metal sheets to have satisfactory characteristics. However, when the friction stir welding method is applied, productivity can be improved, and the welded joint obtained can have high quality.

When the friction stir welding method is applied to structural steel sheets used mainly for the materials of structures such as buildings, ships, heavy machines, pipelines, and automobiles, solidification cracking and hydrogen cracking, which are problems in the conventional fusion welding, can be avoided, and a structural change of the steel sheets is prevented, so that an improvement in joint performance is expected. Since the rotating tool stirs the joint interface, clean surfaces are created and joined together. This is advantageous in that a preparation step necessary for diffusion bonding is unnecessary. As described above, the application of the friction stir welding method to the structural steel sheets is expected to be advantageous in a number of ways. Although the friction stir welding method is widely used for the low-melting point metal sheets, the method is not widely used for structural steel sheets because some problems remain, such as prevention of the occurrence of defects during welding and welding workability such as an increase in welding speed (i.e., the moving speed of the rotating tool).

The main cause of the occurrence of defects in the friction stir welding method described in Patent Literature 2 is the differences in temperature and plastic flow in the thickness direction of the metal sheets. When the rotating tool is pressed against one side of the joint between the metal sheets and moved in the welding direction while rotated, the rotation of a shoulder of the rotating tool causes a sufficient increase in temperature and sufficient shear stress on the side against which the shoulder is pressed. Large deformation thereby occurs at high temperature, and plastic flow enough to obtain a metallurgically welded state by creating clean surfaces in contact with each other at the joint interface is obtained. However, on the opposite side, since smaller shear stress is applied at relatively low temperature, a state in which plastic flow enough to achieve the metallurgically welded state is not obtained is likely to occur.

When the friction stir welding technique described in Patent Literature 2 is applied to structural steel sheets, the above state tends to occur when heat input is low and the welding speed is high because the strength of the structural steel sheets at high temperature is high, and it is difficult to increase the welding speed while the occurrence of defects during welding is prevented.

Patent Literatures 3, 4, and 5 disclose double-sided friction stir welding methods. In these double-sided friction stir welding methods, shoulders of a pair of opposed rotating tools are pressed against the top and bottom sides of the joint between metal sheets to cause large deformation on both sides by a sufficient temperature increase and sufficient shear stress generated by the rotation of the shoulders. Plastic flow enough to obtain a welded state is thereby obtained uniformly in the thickness direction of the metal sheets, and this may allow a high welding speed to be achieved while the occurrence of defects during welding is prevented. In the techniques described in Patent Literatures 3, 4, and 5, the shoulders of the pair of opposed rotating tools are pressed against the top and bottom sides of the metal sheets. However, no consideration is given to the gap between the shoulders of the pair of rotating tools that is significant in obtaining a temperature increase and shear stress enough to obtain the welded state.

CITATION LIST

Patent Literature

PTL 1: Japanese Unexamined Patent Application Publication No. 62-183979
PTL 2: Japanese Unexamined Patent Application Publication (Translation of PCT Application) No. 7-505090
PTL 3: Japanese Patent No. 3261433
PTL 4: Japanese Patent No. 4838385
PTL 5: Japanese Patent No. 4838388

SUMMARY

Technical Problem

The disclosed embodiments solve the problems in the conventional technologies and allows double-sided friction stir welding in which the shoulders of a pair of opposed rotating tools are pressed against the top and bottom sides of the joint between metal sheets and the rotation of the shoulders causes a sufficient temperature increase and sufficient shear stress. This causes large deformation on both sides at higher temperature, and plastic flow enough to achieve a welded state can be obtained uniformly in the thickness direction of the metal sheets. Accordingly, it is an object of the disclosed embodiments to provide a friction stir welding method in which an increase in welding speed is achieved while the occurrence of defects during welding is prevented and in which sufficient strength can be obtained and welding workability can be improved. It is another object to provide a friction stir welding device suitable for the friction stir welding. In particular, it is an object to provide a friction stir welding method in which the pair of opposed rotating tools have a strictly examined gap between their shoulders that is significant in obtaining a temperature increase and shear stress enough to achieve a welded state and to provide a friction stir welding device that embodies the method.

Solution to Problem

The present inventors have conducted extensive studies to solve the foregoing problems and obtained the following findings (a) to (e).

(a) In double-sided friction stir welding, to obtain distributions of temperature increase and shear stress enough to obtain a welded state uniformly in the thickness direction of metal sheets for the purpose of achieving a high welding speed while the occurrence of defects during welding is prevented, it is necessary to strictly control the gap between the shoulders of the pair of opposed rotating tools. In particular, when a tilt angle is given to the pair of rotating tools, controlling the diameter and tilt angle of the shoulders of the rotating tools in addition to the thickness of the metal sheets is effective.

(b) When the rotation direction of one of the pair of opposed rotating tools on the top side is the same as the rotation direction of the other one on the bottom side, the relative speed of one of the rotating tools with respect to the other one is zero. Therefore, as the plastic flow in the metal sheets at the gap between the shoulders of the rotating tools approaches a uniform state, plastic deformation decreases, and heat generation due to the plastic deformation of the metal sheets is not obtained, so that a good welded state cannot be obtained. In order that a temperature increase and shear stress enough to achieve a good welded state are obtained uniformly in the thickness direction of the metal sheets, it is necessary that the rotation direction of one of the pair of rotating tools be opposite to the rotation direction of the other one.

(c) By strictly controlling the gap between the tips of pins of the pair of opposed rotating tools, the temperature increase and the shear stress can be obtained uniformly in the thickness direction of the metal sheets, so that the welding speed can be increased while the occurrence of defects during welding is prevented. Moreover, by adjusting the thickness of the metal sheets and the diameter of the shoulders of the rotating tools, the effect becomes significant.

(d) By strictly controlling the diameter of the shoulders of the pair of opposed rotating tools, the temperature increase and the shear stress can be obtained uniformly in the thickness direction of the metal sheets, and the welding speed can be increased while the occurrence of defects during welding is prevented. In particular, by limiting the diameter of the shoulders in relation to the thickness of the metal sheets, the effect obtained becomes significant.

(e) When the numbers of revolutions of the pair of opposed rotating tools are the same and the ratio of the welding speed to the number of revolutions is strictly controlled, the temperature increase and the shear stress can be obtained uniformly in the thickness direction of the metal sheets, so that the welding speed can be increased while the occurrence of defects during welding is prevented. In particular, by limiting the ratio of the welding speed to the number of revolutions in relation to the gap between the shoulders of the rotating tools, the diameter of the shoulders, and the thickness of the metal sheets, the effect obtained becomes significant.

The disclosed embodiments are based on these findings.

Accordingly, the disclosed embodiments provide a double-sided friction stir welding method including: disposing a pair of opposed rotating tools on top and bottom sides of a butt joint or a lap joint between two metal sheets; moving the pair of rotating tools along the butt joint or the lap joint in a welding direction while the pair of rotating tools are rotated to thereby soften a portion of the metal sheets by heat of friction between the rotating tools and the metal sheets; and stirring the softened portion with the rotating tools to generate plastic flow to thereby join the metal sheets together, wherein each of the pair of rotating tools used includes a shoulder and a pin that is disposed on the shoulder and shares a rotation axis with the shoulder, at least the shoulder and the pin being formed of a material harder than the metal sheets, wherein, with the metal sheets fixed by a holding unit, the pair of rotating tools are pressed against the top and bottom sides of the metal sheets and moved in the welding direction while rotated, wherein the rotation axes of the pair of rotating tools are tilted at a tilt angle $\alpha$ (° with respect to a direction normal to the metal sheets such that tips of the pins are located on a leading side in the welding direction, and the tilt angle $\alpha$ satisfies $$0 < \alpha \leq 3,$$

wherein a gap G (mm) between the shoulders that is created by forming a gap g (mm) between the tips of the pins of the pair of rotating tools satisfies $$(0.5 \times t) - (0.2 \times D \times \sin \alpha) \leq G \leq t - (0.2 \times D \times \sin \alpha),$$

where t is the thickness (mm) of each of the metal sheets when the metal sheets are butted or is the total thickness (mm) of the metal sheets when the metal sheets are lapped, and D is the diameter (mm) of the shoulders of the rotating tools, wherein the diameter D (mm) of the shoulders and the thickness t (mm) of each of the metal sheets when the metal sheets are butted or the total thickness t (mm) of the metal sheets when the metal sheets are lapped satisfy $$4 \times t \leq D \leq 20 \times t,$$

wherein the gap g, the diameter D (mm) of the shoulders of the rotating tools, and the thickness t (mm) of each of the metal sheets when the metal sheets are butted or the total thickness t (mm) of the metal sheets when the metal sheets are lapped satisfy $$[0.1 - 0.09 \times \exp\{-0.011 \times (D/t)^2\}] \times t \leq g \leq [1 - 0.09 \times \exp\{-0.011 \times (D/t)^2\}] \times t,$$

wherein the pair of rotating tools are rotated in opposite directions to perform friction stir welding, and wherein the numbers of revolutions S (rpm) of the pair of rotating tools rotated in the opposite directions are the same, and the ratio T/S of a welding speed T (m/min) of the rotating tools to the number of revolutions S of the rotating tools, the gap G (mm) between the shoulders, the diameter D (mm) of the shoulders, and the thickness t (mm) of each of the metal sheets when the metal sheets are butted or the total thickness t (mm) of the metal sheets when the metal sheets are lapped satisfy $$T/S \leq (1/1000) \times (D/t) \times \{34.5 - 32.2 \times (G/t)\} / \{53 - 3.4 \times (D/t)\}.$$

The disclosed embodiments also provide a double-sided friction stir welding device including a pair of opposed rotating tools that are disposed on top and bottom sides of a butt joint or a lap joint between two metal sheets, the pair of opposed rotating tools being moved along the butt joint or the lap joint in a welding direction while rotated to thereby soften a portion of the metal sheets by heat of friction between the rotating tools and the metal sheets, the softened portion being stirred with the rotating tools to generate plastic flow to thereby join the metal sheets together, wherein each of the rotating tools includes a shoulder and a pin that is disposed on the shoulder and shares a rotation axis with the shoulder, at least the shoulder and the pin being formed of a material harder than the metal sheets, wherein the double-sided friction stir welding device further includes a holding unit that fixes the metal plates when the pair of rotating tools are moved in the welding direction while rotated, wherein the rotation axes of the pair of rotating tools are tilted at a tilt angle α (° with respect to a direction normal to the metal sheets such that tips of the pins are located on a leading side in the welding direction, and the tilt angle α satisfies $$0 < \alpha \leq 3,$$

wherein a gap G (mm) between the shoulders that is created by forming a gap g (mm) between the tips of the pins of the pair of rotating tools satisfies $$(0.5 \times t) - (0.2 \times D \times \sin \alpha) \leq G \leq t - (0.2 \times D \times \sin \alpha),$$

where t is the thickness (mm) of each of the metal sheets when the metal sheets are butted or is the total thickness (mm) of the metal sheets when the metal sheets are lapped, and D is the diameter (mm) of the shoulders of the rotating tools, wherein the diameter D (mm) of the shoulders and the thickness t (mm) of each of the metal sheets when the metal sheets are butted or the total thickness t (mm) of the metal sheets when the metal sheets are lapped satisfy $$4 \times t \leq D \leq 20 \times t,$$

wherein the gap g, the diameter D (mm) of the shoulders of the rotating tools, and the thickness t (mm) of each of the metal sheets when the metal sheets are butted or the total thickness t (mm) of the metal sheets when the metal sheets are lapped satisfy $$[0.1 - 0.09 \times \exp\{-0.011 \times (D/t)^2\}] \times t \leq g$$
$$\leq [1 - 0.09 \times \exp\{-0.011 \times (D/t)^2\}] \times t,$$

wherein the double-sided friction stir welding device further includes a rotation driving unit that rotates the pair of rotating tools in opposite directions, and wherein the numbers of revolutions S (rpm) of the pair of rotating tools rotated in the opposite directions are the same, and the ratio T/S of a welding speed T (m/min) of the rotating tools to the number of revolutions S of the rotating tools, the gap G (mm) between the shoulders, the diameter D (mm) of the shoulders, and the thickness t (mm) of each of the metal sheets when the metal sheets are butted or the total thickness t (mm) of the metal sheets when the metal sheets are lapped satisfy $$T/S \leq (1/1000) \times (D/t) \times \{34.5 - 32.2 \times (G/t)\} / \{53 - 3.4 \times (D/t)\}.$$

Advantageous Effects

In the disclosed embodiments, when double-sided friction stir welding is performed, the shoulders of the pair of opposed rotating tools are pressed against the top and bottom sides of the metal sheets, and the rotation of the shoulders causes a sufficient temperature increase and sufficient shear stress. This causes large deformation on both sides at higher temperature, and plastic flow is generated uniformly in the thickness direction of the metal sheets, so that a good welded state can be obtained. Therefore, the welding speed can be increased while the occurrence of defects during welding is prevented. Sufficient strength can be obtained, and welding workability can be improved, so that an industrially significant effect is obtained.

DETAILED DESCRIPTION

In the disclosed embodiments, two metal sheets are butted or lapped together, and a pair of rotating tools are disposed on the top and bottom sides of the butt joint or the lap joint. Then double-sided friction stir welding is performed.

Referring to FIGS. 1A-2B, double-sided friction stir welding of a butt joint will be described in detail.

Figure 1A:
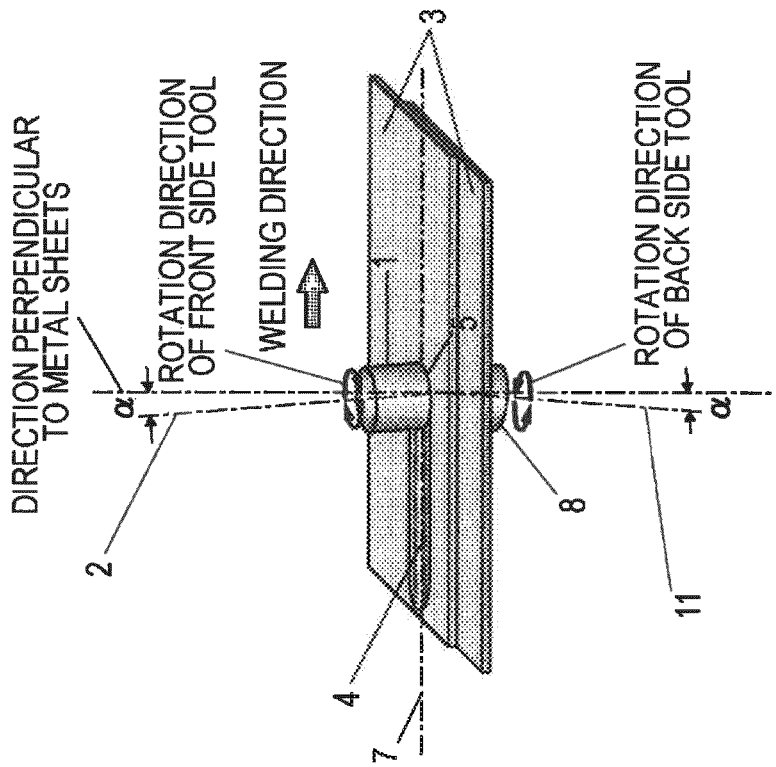
FIGS. 1A and 1B show schematic perspective views of examples of the arrangement of rotating tools and metal sheets in the disclosed embodiments, with FIG. 1A showing the case of a butt joint, and FIG. 1B showing the case of a lap joint.
Figure 1B:
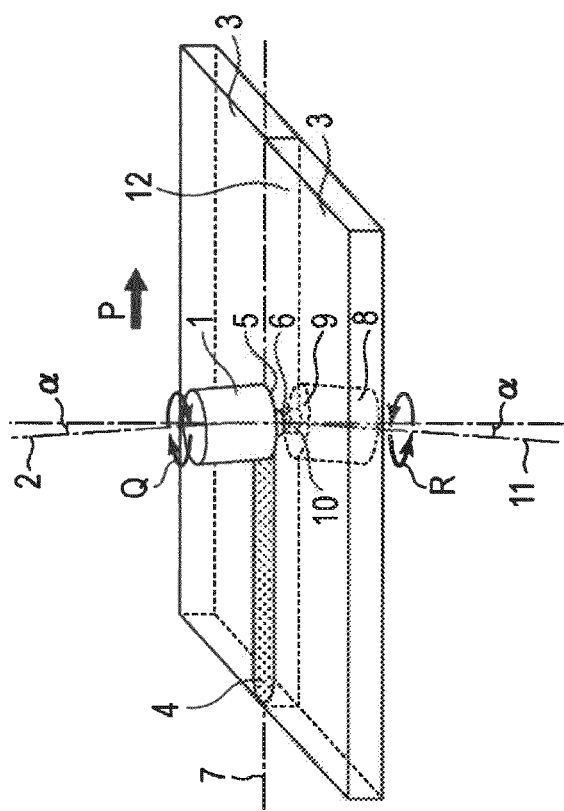

As shown in FIGS. 1A and 1B, a pair of rotating tools 1 and 8 opposed to each other are disposed on the top and bottom sides of two butted metal sheets 3. The rotating tools 1 and 8 are inserted into an unwelded joint 12 from both the top and bottom sides of the metal sheets 3 and moved in a welding direction while rotated. An arrow P in FIGS. 1A and 1B represents the moving direction of the rotating tools 1 and 8 (i.e., a welding direction). An arrow Q represents the rotation direction of the rotating tool 1 disposed on the top side, and an arrow R represents the rotation direction of the rotating tool 8 disposed on the bottom side.

The pair of opposed rotating tools 1 and 8 are rotated to generate frictional heat to thereby soften a portion of the metal sheets 3, and the softened portion is stirred with the pair of rotating tools 1 and 8 to generate plastic flow to thereby join the metal sheets 3 together. The thus-obtained welded joint 4 is formed linearly in the moving direction of the rotating tools 1 and 8. A straight line 7 (hereinafter referred to as a joint center line) extending from the unwelded joint 12 in FIGS. 1A and 1B through the center of the welded joint 4 in its width direction coincides with the trajectory of the rotating tools 1 and 8 moving in the direction of the arrow P (see FIG. 2A).

The two metal sheets 3 are held by a holding unit (not shown) when the rotating tools 1 and 8 are moved along the joint center line 7, and the metal sheets 3 are thereby fixed at prescribed positions. No particular limitation is imposed on the structure of the holding unit, so long as the holding unit used can prevent changes in the positions of the metal sheets 3 during movement of the rotating tools 1 and 8.

Figure 2A:
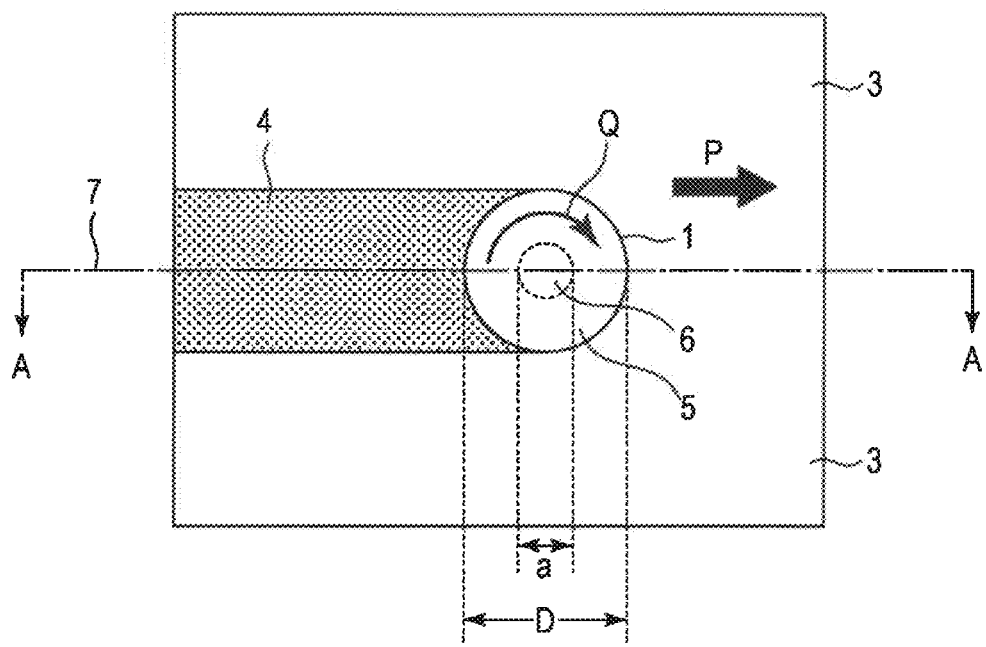
FIG. 2A is a plan view of one of the rotating tools and the metal sheets in FIGS. 1A and 1B.
Figure 2B:
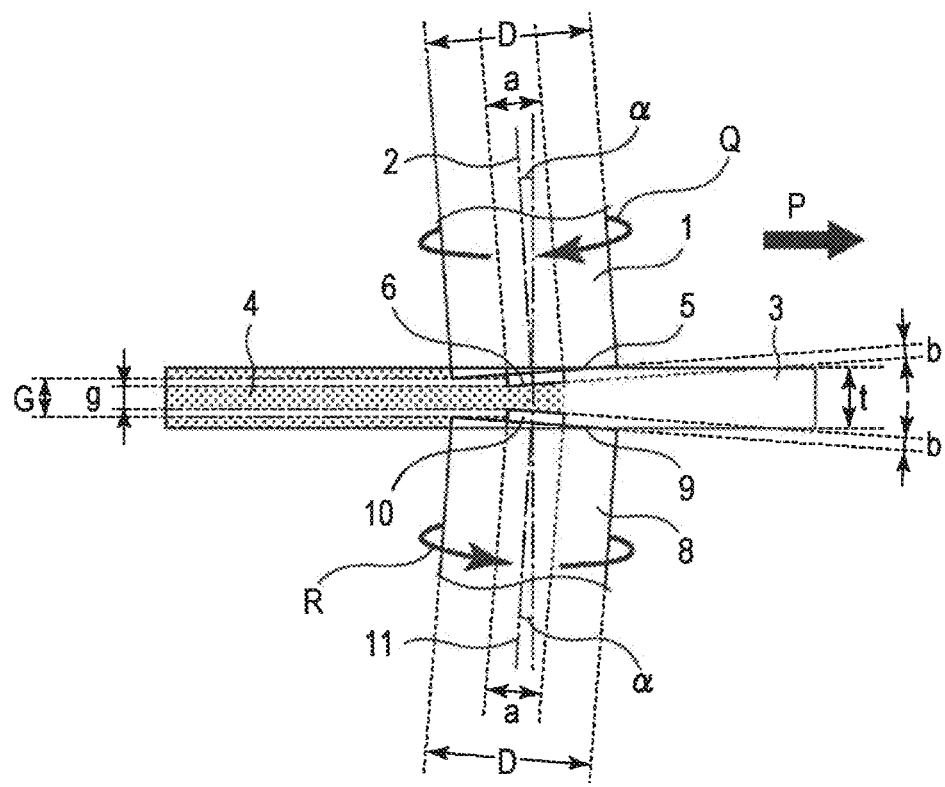
FIG. 2B is a cross-sectional view taken along arrow A-A.

The tip of a pin 6 of the top side rotating tool 1 and the tip of a pin 10 of the bottom side rotating tool 8 do not abut against each other, and a gap g (mm) is present therebetween as shown in FIG. 2B. A gap G (mm) is formed between stepped portions 5 and 9 (hereinafter referred to as shoulders) generated by the difference between the diameter D (mm) of the rotating tools 1 and 8 and the diameter a (mm) of the tips of the pins 6 and 10.

As viewed from the top side, the bottom side rotating tool 8 is rotated in a direction (a direction of arrow R) opposite to the rotation direction of the top side rotating tool 1 (i.e., the direction of arrow Q). For example, as shown in FIG. 2A that is a plan view when the metal sheets 3 are viewed from the top side, when the rotating tool 1 is rotated clockwise, the rotating tool 8 is rotated counterclockwise. Although not illustrated, when the rotating tool 1 is rotated counterclockwise, the rotating tool 8 is rotated clockwise.

As described above, the gap g is formed between the tip of the pin 6 of the rotating tool 1 and the tip of the pin 10 of the rotating tool 8, and the gap G is formed between the shoulder 5 of the rotating tool 1 and the shoulder 9 of the rotating tool 8. Moreover, the rotating tool 1 and the rotating tool 8 are rotated in opposite directions. Since a sufficient temperature increase and sufficient shear stress are applied from both sides, the differences in temperature and plastic flow that are generated in the thickness direction of the metal sheets 3 at the welded joint 4 are reduced, and a uniform welded state can be obtained. Since poor plastic flow that occurs locally in the welded joint 4 can be eliminated, welding defects can be advantageously eliminated. Therefore, sufficient strength can be obtained, and welding workability, particularly the welding speed, can be improved.

The top side rotating tool 1 includes the shoulder 5 and the pin 6 that is disposed on the shoulder 5 and shares a rotation axis 2 with the shoulder 5. The bottom side rotating tool 8 includes the shoulder 9 and the pin 10 that is disposed on the shoulder 9 and shares a rotation axis 11 with the shoulder 9. At least the shoulders 5 and 9 and the pins 6 and 10 are formed of a material harder than the metal sheets 3.

Since the rotation directions Q and R of the opposed rotating tools 1 and 8 on the top and bottom sides are opposite to each other, rotating torques applied to the metal sheets 3 by the rotation of the rotating tools 1 and 8 cancel each other. Therefore, jigs holding the metal sheets 3 can have a simpler structure than those used in a conventional friction stir welding method in which a rotating tool is pressed against metal sheets from one side to join the metal sheets together.

If the rotation directions of the opposed rotating tools 1 and 8 on the top and bottom sides are the same, the relative speed of the bottom side rotating tool 8 with respect to the top side rotating tool 1 is zero. Therefore, as the plastic flow in the metal sheets 3 at the gap between the shoulders 5 and 9 of the rotating tools 1 and 8 approaches a uniform state, plastic deformation decreases, and heat generation due to the plastic deformation of the metal sheets 3 is not obtained, so that a good welded state cannot be achieved.

In order that a temperature increase and shear stress enough to achieve a good welded state are obtained uniformly in the thickness direction of the workpieces, the rotation directions Q and R of the opposed rotating tools 1 and 8 on the top and bottom sides are opposite to each other.

In the disclosed embodiments, adjusting the arrangement of the rotating tools as follows is effective in improving the service life of the rotating tools, preventing the occurrence of welding defects, and increasing the welding speed.

First, the tilt angle $\alpha$ (° of the top and bottom side rotating tools will be described.

The rotation axes 2 and 11 of the rotating tools 1 and 8 are tilted at an angle $\alpha$ (° with respect to a direction normal to the metal sheets 3, so that the tips of the pins 6 and 10 are located on a leading side in the welding direction P. In this case, loads on the rotating tools 1 and 8 are applied thereto as compressive force components in the direction of the rotation axes 2 and 11. It is necessary that the pair of rotating tools 1 and 8 be formed of a material harder than the metal sheets 3. When a low-toughness material such as a ceramic is used, if a force in a bending direction is applied to the pins 6 and 10, stress is concentrated locally, and the pins 6 and 10 may break. Therefore, by tiling the rotation axes 2 and 11 of the pair of rotating tools 1 and 8 at the angle $\alpha$ (hereinafter referred to as a tilt angle), the loads on the rotating tools 1 and 8 are applied as the compressive force components in the rotation axes 2 and 11. In this case, the force in the bending direction can be reduced, and breakage of the rotating tools 1 and 8 can be avoided.

The above effect can be obtained when the tilt angle $\alpha$ exceeds 0°. However, if the tilt angle $\alpha$ exceeds 3°, the top and bottom surfaces of the welded joint are concaved, and this adversely affects the welded joint strength. Therefore, the upper limit of the tilt angle $\alpha$ is 3°. Specifically, the tilt angle $\alpha$ is within the range of $0 < \alpha \leq 3$.

Next, the gap G (mm) between the shoulders of the top and bottom side rotating tools will be described.

In the double-sided friction stir welding, to increase the welding speed while the occurrence of defects during welding is prevented, it is necessary to strictly control the gap G between the shoulders 5 and 9 of the pair of rotating tools 1 and 8. The gap G is important in order that a temperature increase and shear stress enough to achieve a welded state are obtained uniformly in the thickness direction of the metal sheets 3.

The tilt angle α of the top and bottom side rotating tools 1 and 8 is set to 0°<α≤3°. The gap G (mm) is set within the range of from (0.5×t)−(0.2×D×sin α) to t−(0.2×D×sin α) inclusive using the diameter D (mm) of the shoulders 5 and 9 of the rotating tools 1 and 8 and the thickness t (mm) of each of the metal sheets 3 when they are butt welded or the total thickness t (mm) of the metal sheets 3 when they are lap welded. In this case, the shoulders 5 and 9 of the opposed rotating tools 1 and 8 come into intimate contact with or are pressed into the top and bottom sides of the metal sheets 3. Therefore, the metal sheets 3 are pressed under a sufficient load from the top and bottom sides by the shoulders 5 and 9 of the rotating tools 1 and 8.

Figure 3A:
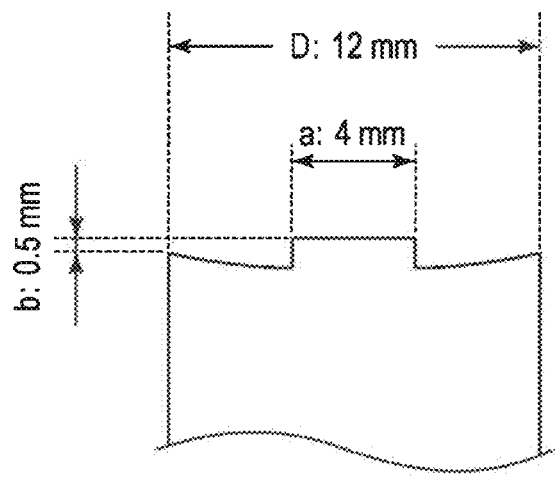
FIGS. 3A and 3B show cross-sectional views illustrating the cross-sectional dimensions of rotating tools used in Examples.
Figure 4:
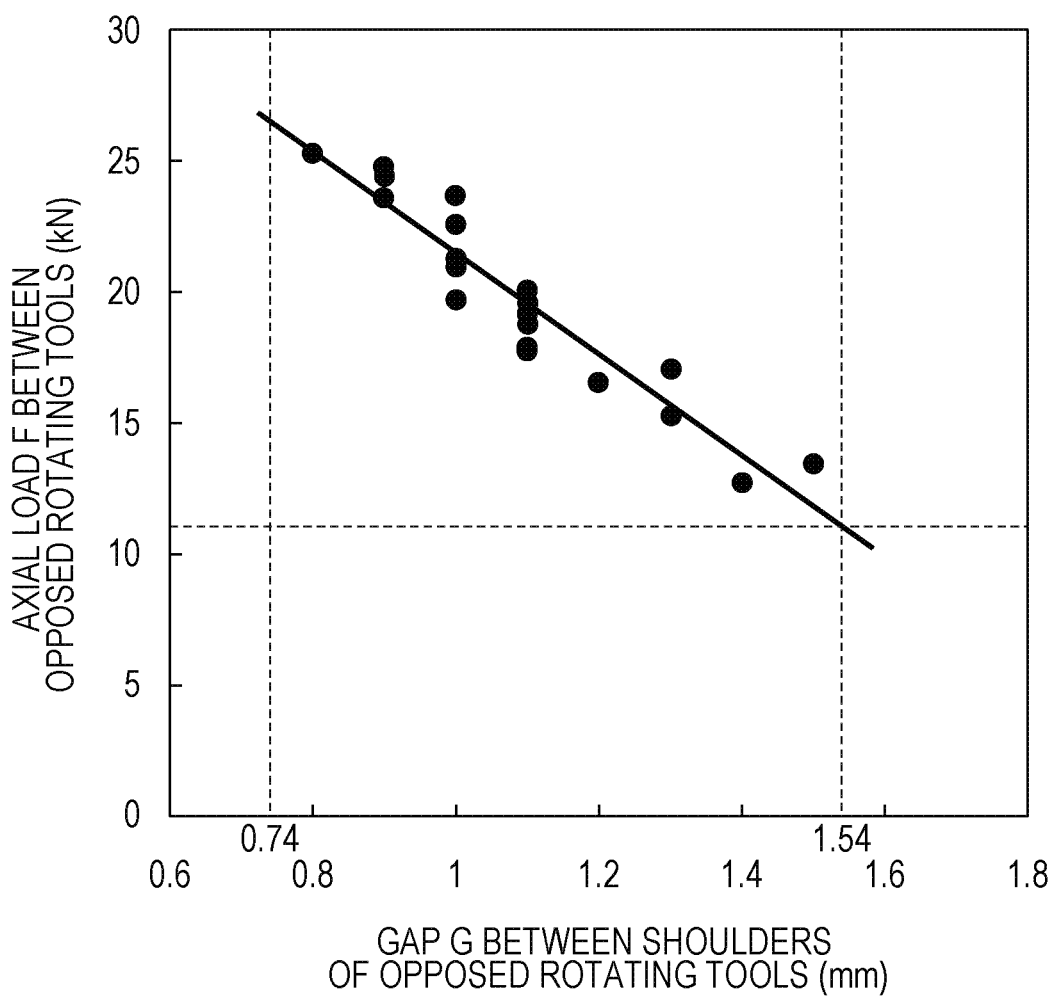
FIG. 4 shows the relation between the axial load between opposed rotating tools and the gap between shoulders of the opposed rotating tools.

FIG. 4 shows the gap G between the shoulders of the top and bottom side rotating tools and an axial load F therebetween. In this case, steel sheets having the thickness, chemical composition, and tensile strength shown in No. 1 in Table 1 were used. The butt joint surface had a surface state equivalent to that obtained by milling, and were a so-called I-type groove with no beveling. Rotating tools having a cross-sectional shape shown in FIG. 3A and formed of tungsten carbide (WC) were disposed on the top and bottom sides and pressed against the steel sheets at a tilt angle α of 1.5° to perform friction stir welding with the number of revolutions of the top and bottom side rotating tools set to 1,000 rpm and the welding speed set to 2 m/min. In this case, the limited range of the gap G is from 0.74 mm to 1.54 mm inclusive, and the axial load F can be 10 kN or more when the gap G is 1.54 mm or less. When the metal sheets are pressed under a sufficient load, friction by the shoulders 5 and 9 of the rotating tools 1 and 8 and plastic deformation in a shear direction facilitate heat generation and plastic flow. The plastic flow is thereby facilitated uniformly in the thickness direction, and a good welded state can be achieved. If the gap G between the shoulders 5 and 9 of the pair of rotating tools 1 and 8 exceeds t−(0.2×D×sin α), the shoulders 5 and 9 of the rotating tools 1 and 8 cannot press the top and bottom sides of the metal sheets 3 under a sufficient load, and the above effect cannot be obtained. If the gap G is less than (0.5×t)−(0.2×D×sin α), the top and bottom sides of the welded joint are concaved, and this adversely affect the welded joint strength. Therefore, the gap G satisfies (0.5×t)−(0.2×D×sin α)≤G≤t−(0.2×D×sin α).

Next, the gap g (mm) between the tips of the pins of the top and bottom side rotating tools will be described.

To obtain a temperature increase and shear stress uniformly in the thickness direction of the metal sheets 3 to thereby achieve an increase in welding speed while the occurrence of defects during welding is prevented, strictly controlling the gap g between the tips of the pins 6 and 10 of the opposed rotating tools 1 and 8 is effective. In particular, when the ratio (D/t) of the diameter D of the shoulders 5 and 9 of the rotating tools 1 and 8 to the thickness t (mm) of each of the metal sheets 3 (when they are butt welded) or the total thickness t (mm) of the lapped metal sheets (when they are lap welded) is small, the frictional heat generated at the shoulders of the top and bottom side rotating tools is less likely to be transferred in the thickness direction, and softening of the material by the heat from the shoulders does not proceed, so that plastic flow is unlikely to occur uniformly in the thickness direction. Since it is necessary to generate frictional heat and plastic flow necessary and sufficient to obtain a welded state from the pins, limiting the gap g between the tips of the pins 6 and 10 within the range of from $[0.1-0.09\times\exp\{-0.011\times(D/t)^2\}]\times t$ to $[1-0.9\times\exp\{-0.011\times(D/t)^2\}]\times t$ inclusive is effective. As can be seen from this formula, as D/t decreases, the upper and lower limits of the gap g are controlled at lower values. The gap g can be adjusted by changing the positions of the top and bottom side rotating tools or the length b of the pins of the rotating tools.

A gap g between the tips of the pins 6 and 10 of less than $[0.1-0.09\times\exp\{-0.011\times(D/t)^2\}]\times t$ is not preferable because the tips of the pins 6 and 10 of the opposed rotating tools 1 and 8 may come into contact with each other and break. If the gap g exceeds $[1-0.9\times\exp\{-0.011\times(D/t)^2\}]\times t$, the plastic flow and frictional heat are not effectively obtained uniformly in the thickness direction. Therefore, gap g is $[0.1-0.09\times\exp\{-0.011\times(D/t)^2\}]\times t \leq g \leq [1-0.9\times\exp\{-0.011\times(D/t)^2\}]\times t$.

Next, the diameter D (mm) of the shoulders of the top and bottom side rotating tools will be described.

Controlling the diameter D of the shoulders 5 and 9 of the opposed rotating tools 1 and 8 strictly in addition to the gaps G and g described above is effective in obtaining a temperature increase and shear stress uniformly in the thickness direction of the metal sheets 3 to thereby achieve an increase in welding speed while the occurrence of defects during welding is prevented. When the ratio of the diameter D to t is small, the frictional heat generated at the shoulders of the top and bottom side rotating tools is less likely to be transferred in the thickness direction, and softening of the material by the heat from the shoulders does not proceed, so that plastic flow is unlikely to occur uniformly in the thickness direction. Therefore, in particular, by limiting the diameter D within the range of from 4×t to 20×t inclusive using the thickness t (mm) of the metal sheets 3, the effect can be obtained.

If the diameter D is less than 4×t, plastic flow uniform in the thickness direction cannot be effectively obtained. A diameter D exceeding 20×t is not preferable because the region in which the plastic flow occurs is unnecessarily broad and an excessive load is applied to the device. Therefore, the diameter D is 4×t≤D≤20×t. The thickness t is the thickness t of each of the metal sheets 3 when they are butt welded and is the total thickness t of the lapped metal sheets 3 when they are lap welded.

Next, the ratio T/S of the welding speed T (m/min) of the top and bottom side rotating tools to the number of revolutions S of the rotating tools will be described.

To obtain a temperature increase and shear stress uniformly in the thickness direction of the metal sheets 3 to thereby achieve an increase in the welding speed while the occurrence of defects during welding is prevented, controlling the ratio (T/S) of the welding speed T (m/min) of the opposed rotating tools 1 and 8 to the number of revolutions S (rpm) of the rotating tools strictly is effective.

In double-sided friction stir welding, frictional heat per unit time $Q_{time}$ increases as the axial load F between the top and bottom side rotating tools, the diameter D of the shoulders, or the number of revolutions S increases. Therefore, the following relation may hold.

$$Q_{time}(J/min) \propto F \times D \times S$$

By dividing the frictional heat per unit time by the welding speed T (m/min) and the thickness t (mm), the amount of heat can be standardized by the distances in the welding direction and the thickness direction.

$$Q_{J\text{-}t}(\text{J/mm}^2)=Q_{time}/(T\times t)\propto F\times D\times S/(1000\times T\times t)$$

Figure 5:
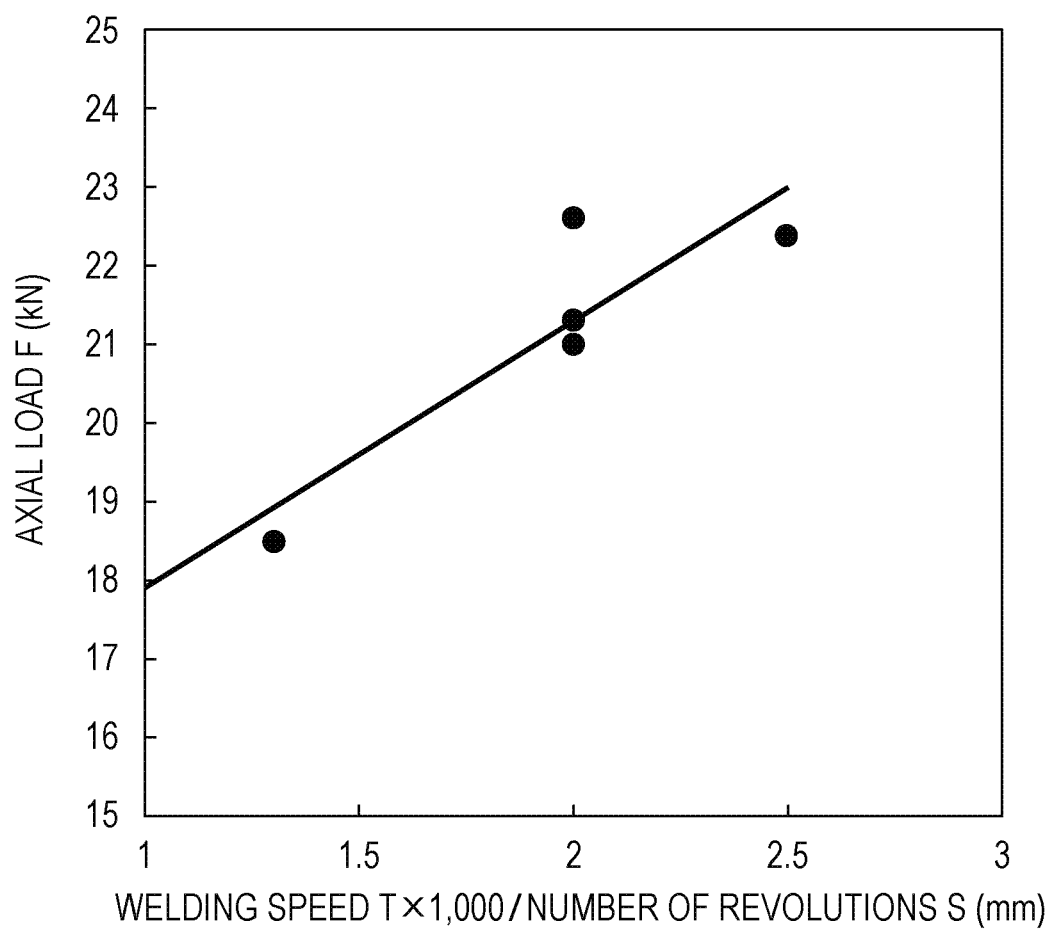
FIG. 5 shows the relation between the axial load and the ratio of the welding speed to the number of revolutions.

As for the axial load F (kN), it is necessary to give consideration to the relation between the gap G between the shoulders of the top and bottom side rotating tools and the axial load F as shown in FIG. 4 and to the relation between the welding speed T and the number of revolutions S of the top and bottom side rotating tools as shown in FIG. 5.

FIG. 5 shows the relation between the axial load F (kN) and the welding speed T×1000/the number of revolutions S (mm). In this case, steel sheets having the thickness, chemical composition, and tensile strength shown in No. 1 in Table 1 were used. The butt joint surface had a surface state equivalent to that obtained by milling, and were a so-called I-type groove with no beveling. Rotating tools having a cross-sectional shape shown in FIG. 3A and formed of tungsten carbide (WC) were disposed on the top and bottom sides and pressed against the steel sheets at a tilt angle α of 1.5° to perform friction stir welding with the gap G between the rotating tools set to 1.0 mm, the number of revolutions of the top and bottom side rotating tools set to 2,000 to 3,000 rpm, and the welding speed set to 4 to 5 m/min. As the welding speed T/the number of revolutions S increases, the axial load F tends to increase.

As can be seen from the experimental tendencies shown in FIGS. 4 and 5, the axial load F is represented by the following formula using the welding speed T, the number of revolutions S of the top and bottom side rotating tools, and the sheet thickness t:

$$F=3.4\times T\times 1000/S-32.2\times G/t+34.5.$$

The $Q_{J\text{-}t}$ described above is thereby represented as follows.

$$Q_{J\text{-}t}(\text{J/mm}^2)\propto F\times D\times S/(1000\times T\times t)$$

$$=(3.4\times T\times 1000/S-32.2\times G/t+34.5)\times D\times S/(1000\times T\times t)$$

Friction stir welding was performed using steel sheets having the thickness, chemical composition, and tensile strength shown in No. 1 in Table 1. The butt joint surface had a surface state equivalent to that obtained by milling, and were a so-called I-type groove with no beveling. Rotating tools having a cross-sectional shape shown in FIG. 3A and formed of tungsten carbide (WC) were disposed on the top and bottom sides and pressed against the steel sheets at a tilt angle α of 1.5° to perform friction stir welding with the gap G between the shoulders of the rotating tools set to 0.8 to 1.5 mm, the number of revolutions of the top and bottom side rotating tools set to 400 to 3,000 rpm, and the welding speed set to 1 to 5 m/min. When the right hand side of the above formula that is proportional to $Q_{J\text{-}t}$ satisfies $$(3.4\times T\times 1000/S-32.2\times G/t+34.5)\times D\times S/(1000\times T\times t)\geq 53,$$

heat input is sufficient, and a sound joint with no defects is obtained.

By modifying the above formula, $$T/S\leq(1/1000)\times(D/t)\times\{34.5-32.2\times(G/t)\}/\{53-3.4\times(D/t)\}$$

is obtained. The ratio T/S of the welding speed T (m/min) to the number of revolutions S (rpm) of the rotating tools is represented using the ratio D/t of the diameter D (mm) of the shoulders of the top and bottom side rotating tools to the thickness t (mm) of each of the metal sheets 3 (when they are butted) or the total thickness t (mm) of the lapped metal sheets 3 (when they are lapped) and the ratio G/t of the gap G (mm) between the shoulders 5 and 9 of the rotating tools 1 and 8 to the thickness t (mm) of each of the metal sheets 3 (when they are butted) or the total thickness t (mm) of the lapped metal sheets 3 (when they are lapped).

In particular, when the ratio D/t of the diameter D (mm) of the shoulders 5 and 9 of the rotating tools 1 and 8 to the thickness t (mm) of each of the metal sheets 3 (when they are butted) or the total thickness t (mm) of the lapped metal sheets 3 (when they are lapped) is small, i.e., when the frictional heat generated at the shoulders of the top and bottom side rotating tools is less likely to be transferred in the thickness direction and softening of the material by the heat from the shoulders does not proceed, plastic flow is less likely to occur uniformly in the thickness direction. Alternatively, when the ratio G/t of the gap G between the shoulders 5 and 9 of the rotating tools 1 and 8 to the thickness t (mm) of each of the metal sheets 3 (when they are butted) or the total thickness t (mm) of the lapped metal sheets 3 (when they are lapped) is large, i.e., when the axial load between the top and bottom side rotating tools is small relative to the thickness t and the frictional heat generated between the material and the rotating tools is small, compositional flow is less likely to occur uniformly in the thickness direction. Therefore, limiting the ratio T/S of the welding speed T of the opposed rotating tools 1 and 8 to the number of revolutions S to equal to or less than $(1/1000)\times(D/t)\times\{34.5-32.2\times(G/t)\}/\{53-3.4\times(D/t)\}$ is effective. Note that the numbers of revolutions S of the opposed rotating tools 1 and 8 are the same.

The pins of the top and bottom side rotating tools 1 and 8 may be tapered from the interfaces with the shoulders toward their forward end. The length b of the pins 6 and 10 may be appropriately determined according to the tilt angle α, the gap G, the gap g, the diameter D, and the thickness t. The diameter a (mm) of the tips of the pins 6 and 10 may be set as a matter of design change by one skilled in the art.

Other welding conditions may be set as a matter of design choice by one skilled in the art. In this manner, the number of revolutions of the opposed rotating tools 1 and 8 can be set within the range of 100 to 5,000 rpm, and the welding speed can be increased to 1,000 mm/min or higher.

The metal sheets 3 used in the disclosed embodiments may be preferably general structural steel sheets, carbon steel sheets, steel sheets corresponding to, for example, JIS G 3106 and JIS G 4051, etc. The disclosed embodiments are advantageously applicable to high-strength structural steel sheets with a tensile strength of 800 MPa or more. Even in this case, the welded joint can have a strength of 85% or more and even 90% or more of the tensile strength of the steel sheets.

Examples

Figure 3B:
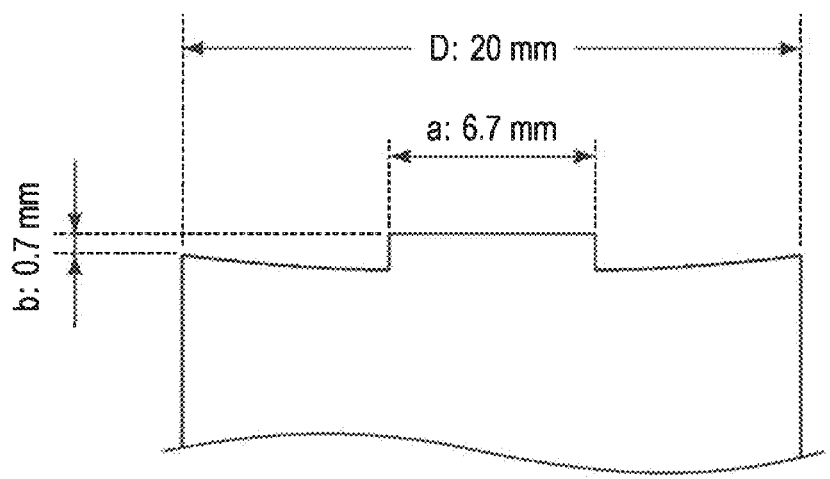

Steel sheets having the thicknesses, chemical compositions, tensile strengths shown in Table 1 were used to perform friction stir welding. When the steel sheets were butt welded, the butt joint surface had a surface state equivalent to that obtained by milling, and were a so-called I-type groove with no beveling. Rotating tools were pressed against the butt joint of the steel sheets from both the top and bottom sides to perform welding. When the steel sheets were lap welded, two steel sheets of the same type were lapped, and the rotating tools were pressed against the lap joint of the steel sheets from both the top and bottom sides to perform welding. As for the rotation directions of the top and bottom side rotating tools, the top side rotating tool (the rotating tool 1) was rotated clockwise in a plan view when the steel sheets (the metal sheets 3) were viewed from the top side as shown in FIG. 2A, and the bottom side rotating tool (the rotating tool 8) was rotated counterclockwise. The welding conditions for the friction stir welding are shown in Table 2. Two types of rotating tools formed of tungsten carbide (WC) and having cross sectional shapes shown in FIGS. 3A and 3B were used.

TABLE 1

| No. | Sheet thickness (mm) | Chemical composition (% by mass) | | | | | Tensile strength (MPa) |
|---|---|---|---|---|---|---|---|
| | | C | Si | Mn | P | S | |
| 1 | 1.6 | 0.3 | 0.21 | 0.69 | 0.012 | 0.003 | 1010 |
| 2 | 2.4 | 0.16 | 0.07 | 0.69 | 0.016 | 0.009 | 425 |
| 3 | 1.2 | 0.3 | 0.21 | 0.69 | 0.012 | 0.003 | 1012 |

TABLE 2

| | Test steel sheet | Thickness of test steel sheet (mm) | Type of joint | Top side welding tool | Bottom side welding tool | Diameter D of shoulders of top and bottom side rotating tools D (mm) | Tilt angle α of top and bottom side rotating tools (°) |
|---|---|---|---|---|---|---|---|
| Example 1 | 1 | 1.6 | Butt | 12φ-0.5 L | 12φ-0.5 L | 12 | 0.5 |
| Example 2 | 1 | 1.6 | Butt | 12φ-0.5 L | 12φ-0.5 L | 12 | 1.5 |
| Example 3 | 1 | 1.6 | Butt | 12φ-0.5 L | 12φ-0.5 L | 12 | 3.0 |
| Example 4 | 1 | 1.6 | Butt | 12φ-0.5 L | 12φ-0.5 L | 12 | 1.5 |
| Example 5 | 1 | 1.6 | Butt | 12φ-0.5 L | 12φ-0.5 L | 12 | 1.5 |
| Example 6 | 1 | 1.6 | Butt | 12φ-0.5 L | 12φ-0.5 L | 12 | 1.5 |
| Example 7 | 1 | 1.6 | Butt | 20φ-0.7 L | 20φ-0.7 L | 20 | 1.5 |
| Example 8 | 2 | 2.4 | Butt | 12φ-0.5 L | 12φ-0.5 L | 12 | 1.5 |
| Example 9 | 2 | 2.4 | Butt | 20φ-0.7 L | 20φ-0.7 L | 20 | 1.5 |
| Example 10 | 2 | 2.4 | Butt | 20φ-0.7 L | 20φ-0.7 L | 20 | 1.5 |
| Example 11 | 3 | 1.2 | Lap | 20φ-0.7 L | 20φ-0.7 L | 20 | 1.5 |
| Example 12 | 3 | 1.2 | Lap | 20φ-0.7 L | 20φ-0.7 L | 20 | 1.5 |
| Comparative Example 1 | 1 | 1.6 | Butt | 12φ-0.5 L | 12φ-0.5 L | 12 | 3.0 |
| Comparative Example 2 | 1 | 1.6 | Butt | 12φ-0.5 L | 12φ-0.5 L | 12 | 4.0 |
| Comparative Example 3 | 1 | 1.6 | Butt | 12φ-0.5 L | 12φ-0.5 L | 12 | 3.0 |
| Comparative Example 4 | 1 | 1.6 | Butt | 12φ-0.5 L | 12φ-0.5 L | 12 | 1.5 |
| Comparative Example 5 | 1 | 1.6 | Butt | 20φ-0.7 L | 20φ-0.7 L | 20 | 4.0 |
| Comparative Example 6 | 2 | 2.4 | Butt | 12φ-0.5 L | 12φ-0.5 L | 12 | 1.5 |
| Comparative Example 7 | 2 | 2.4 | Butt | 20φ-0.7 L | 20φ-0.7 L | 20 | 0.5 |
| Comparative Example 8 | 2 | 2.4 | Butt | 20φ-0.7 L | 20φ-0.7 L | 20 | 4.0 |
| Comparative Example 9 | 3 | 1.2 | Lap | 20φ-0.7 L | 20φ-0.7 L | 20 | 0.5 |
| Comparative Example 10 | 3 | 1.2 | Lap | 20φ-0.7 L | 20φ-0.7 L | 20 | 4.0 |

| | Gap G between shoulders of top and bottom side rotating tools (mm) | Gap g between tips of pins of top and bottom side rotating tools (mm) | Number of revolutions S of rotating tools | | Welding speed T (m/min) | T/S |
|---|---|---|---|---|---|---|
| | | | Top side (rpm) | Bottom side (rpm) | | |
| Example 1 | 1.20 | 0.27 | 2000 | 2000 | 4 | 0.0020 |
| Example 2 | 1.10 | 0.31 | 1500 | 1500 | 4 | 0.0027 |
| Example 3 | 0.90 | 0.32 | 1500 | 1500 | 4 | 0.0027 |
| Example 4 | 1.00 | 0.17 | 2500 | 2500 | 5 | 0.0020 |
| Example 5 | 1.40 | 0.61 | 3000 | 3000 | 3 | 0.0010 |
| Example 6 | 0.90 | 0.11 | 2500 | 2500 | 5 | 0.0020 |
| Example 7 | 1.30 | 0.25 | 600 | 600 | 3 | 0.0050 |
| Example 8 | 1.50 | 0.71 | 3000 | 3000 | 2 | 0.0007 |
| Example 9 | 2.20 | 1.15 | 2500 | 2500 | 2 | 0.0008 |
| Example 10 | 1.80 | 0.75 | 2000 | 2000 | 2 | 0.0010 |
| Example 11 | 2.20 | 1.15 | 2500 | 2500 | 2 | 0.0008 |
| Example 12 | 1.80 | 0.75 | 2000 | 2000 | 2 | 0.0010 |
| Comparative Example 1 | 1.50 | 0.92 | 3000 | 3000 | 4 | 0.0013 |
| Comparative Example 2 | 1.30 | 0.86 | 2000 | 2000 | 4 | 0.0020 |
| Comparative Example 3 | 0.65 | 0.07 | 1500 | 1500 | 4 | 0.0027 |
| Comparative Example 4 | 1.10 | 0.31 | 1000 | 1000 | 4 | 0.0040 |
| Comparative Example 5 | 1.40 | 0.93 | 600 | 600 | 3 | 0.0050 |
| Comparative Example 6 | 1.80 | 1.01 | 3000 | 3000 | 2 | 0.0007 |
| Comparative Example 7 | 1.10 | 0.24 | 2500 | 2500 | 2 | 0.0008 |
| Comparative Example 8 | 1.20 | 1.32 | 2000 | 2000 | 2 | 0.0010 |
| Comparative Example 9 | 1.10 | 0.24 | 2500 | 2500 | 2 | 0.0008 |
| Comparative Example 10 | 1.20 | 1.32 | 2000 | 2000 | 2 | 0.0010 |

Table 3 shows the presence or absence of surface defects in observation of the appearance of each weld joint, the presence and absence of internal defects in observation of a cross section of each joint, and the tensile strength of each weld joint obtained. The tensile strength was determined by cutting a tensile test piece with dimensions of No. 1 test specimen defined in JIS Z 3121 from the weld joint obtained and subjecting the test piece to a tensile test.

TABLE 3

|  | Surface defects in observation of appearance of joint | Internal defects in observation of cross section of joint | Tensile strength (MPa) |
| --- | --- | --- | --- |
| Example 1 | No | No | 1003 |
| Example 2 | No | No | 1005 |
| Example 3 | No | No | 1006 |
| Example 4 | No | No | 1003 |
| Example 5 | No | No | 998 |
| Example 6 | No | No | 1002 |
| Example 7 | No | No | 995 |
| Example 8 | No | No | 421 |
| Example 9 | No | No | 422 |
| Example 10 | No | No | 423 |
| Example 11 | No | No | 994 |
| Example 12 | No | No | 999 |
| Comparative Example 1 | Yes (unwelded portion) | Yes | 552 |
| Comparative Example 2 | Yes (concaved) | Yes | 534 |
| Comparative Example 3 | Yes (concaved) | No | 772 |
| Comparative Example 4 | Yes (unwelded portion) | Yes | 631 |
| Comparative Example 5 | Yes (unwelded portion) | Yes | 589 |
| Comparative Example 6 | Good | Yes | 281 |
| Comparative Example 7 | Yes (concaved) | No | 275 |
| Comparative Example 8 | Yes (concaved) | No | 284 |
| Comparative Example 9 | Yes (concaved) | No | 687 |
| Comparative Example 10 | Yes (concaved) | No | 632 |

As shown in Table 3, in Examples 1 to 10 of the butt joint and Examples 11 and 12 of the lap joint, even when the welding speed was increased to 2 m/min or higher, no surface defects were found in the observation of the appearances of the joints, and no internal defects were found in the observation of the cross sections of the joints, so that a sound welded state was found to be obtained. The joint strength was 95% more of the tensile strength of the steel sheets used as base materials.

In Comparative Examples 1 to 7 of the butt joint and Comparative Examples 8 to 10 of the lap joint, surface defects were found in the joint appearance observation, or internal defects were found in the joint cross section observation. Both were found in some cases. Therefore, a sound welded state was not obtained. Moreover, the joint strength was 70% or less of the tensile strength of the steel sheets used as base materials.

The invention claimed is:

1. A double-sided friction stir welding method comprising:
   disposing a first rotating tool on a top side of a butt joint between two metal sheets and a second rotating tool on a bottom side of the butt joint;
   moving the rotating tools along the butt joint in a welding direction while the rotating tools are rotated to thereby soften a portion of the metal sheets by heat of friction between the rotating tools and the metal sheets; and
   stirring the softened portion with the rotating tools to generate plastic flow to thereby join the metal sheets together,
   wherein each of the rotating tools includes a shoulder and a pin that is disposed on the shoulder and shares a rotation axis with the shoulder, at least the shoulder and the pin being formed of a material harder than the metal sheets,
   with the metal sheets fixed by a holding unit, the rotating tools are pressed against the respective top and bottom sides of the metal sheets and moved in the welding direction while rotated,
   the rotation axes of the rotating tools are tilted at a tilt angle $\alpha$(°) with respect to a direction normal to the metal sheets such that tips of the pins are located on a leading side in the welding direction, and the tilt angle $\alpha$ satisfies:

$0<\alpha\leq 3$, a gap G (mm) between the shoulders that is created by forming a gap g (mm) between the tips of the pins of the rotating tools satisfies:

$(0.5\times t)-(0.2\times D\times \sin\alpha)\leq G\leq t-(0.2\times D\times \sin\alpha)$, where t is the thickness (mm) of each of the metal sheets, and D is the diameter (mm) of the shoulders of the rotating tools,
   the diameter D (mm) of the shoulders and the thickness t (mm) of each of the metal sheets satisfy:

$4\times t\leq D\leq 20\times t$, the gap g, the thickness t (mm) of each of the metal sheets, and the diameter D (mm) of the shoulders of the rotating tools satisfy:

$[0.1-0.09\times \exp\{-0.011\times (D/t)^2\}]\times t\leq g\leq [1-0.09\times \exp\{-0.011\times (D/t)^2\}]\times t$, the pair of rotating tools are rotated in opposite directions to perform friction stir welding, and
   numbers of revolutions S (rpm) of the rotating tools rotated in the opposite directions are the same, and a ratio T/S of a welding speed T (m/min) of the rotating tools to the number of revolutions S of the rotating tools, the gap G (mm) between the shoulders, the diameter D (mm) of the shoulders, and the thickness t (mm) of each of the metal sheets satisfy:

$T/S\leq (1/1000)\times (D/t)\times \{34.5-32.2\times (G/t)\}/\{53-3.4\times (D/t)\}$.

2. A double-sided friction stir welding method comprising:
   disposing a first rotating tool on a top side of a lap joint between two metal sheets and a second rotating tool on a bottom side of the lap joint;
   moving the rotating tools along the lap joint in a welding direction while the rotating tools are rotated to thereby soften a portion of the metal sheets by heat of friction between the rotating tools and the metal sheets; and
   stirring the softened portion with the rotating tools to generate plastic flow to thereby join the metal sheets together,
   wherein each of the rotating tools includes a shoulder and a pin that is disposed on the shoulder and shares a rotation axis with the shoulder, at least the shoulder and the pin being formed of a material harder than the metal sheets, with the metal sheets fixed by a holding unit, the rotating tools are pressed against the respective top and bottom sides of the metal sheets and moved in the welding direction while rotated, the rotation axes of the rotating tools are tilted at a tilt angle $\alpha(°)$ with respect to a direction normal to the metal sheets such that tips of the pins are located on a leading side in the welding direction, and the tilt angle $\alpha$ satisfies:

$$0<\alpha\leq 3,$$

a gap G (mm) between the shoulders that is created by forming a gap g (mm) between the tips of the pins of the rotating tools satisfies:

$$(0.5\times t)-(0.2\times D\times\sin\alpha)\leq G\leq t-(0.2\times D\times\sin\alpha),$$

where t is the total thickness (mm) of the lapped metal sheets, and D is the diameter (mm) of the shoulders of the rotating tools, the diameter D (mm) of the shoulders and the total thickness t (mm) of the metal sheets satisfy:

$$4\times t\leq D\leq 20\times t,$$

the gap g, the total thickness t (mm) of the metal sheets, and the diameter D (mm) of the shoulders of the rotating tools satisfy:

$$[0.1-0.09\times\exp\{-0.011\times(D/t)^2\}]\times t\leq g\leq[1-0.09\times\exp\{-0.011\times(D/t)^2\}]\times t,$$

the pair of rotating tools are rotated in opposite directions to perform friction stir welding, and numbers of revolutions S (rpm) of the pair of rotating tools rotated in the opposite directions are the same, and a ratio T/S of a welding speed T (m/min) of the rotating tools to the number of revolutions S of the rotating tools, the gap G (mm) between the shoulders, the diameter D (mm) of the shoulders, and the total thickness t (mm) of the metal sheets satisfy:

$$T/S\leq(1/1000)\times(D/t)\times\{34.5-32.2\times(G/t)\}/\{53-3.4\times(D/t)\}.$$

\* \* \* \* \*